J. MILLER.
Coffee-Roaster.
No. 204,067. Patented May 21, 1878.
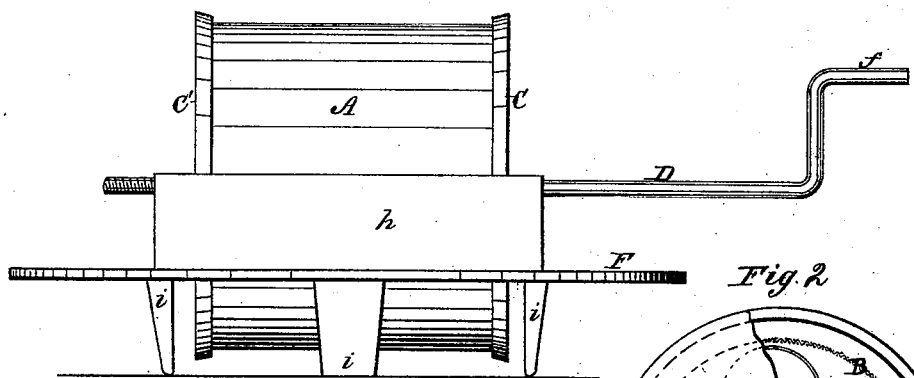
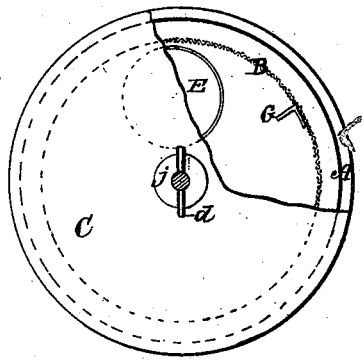
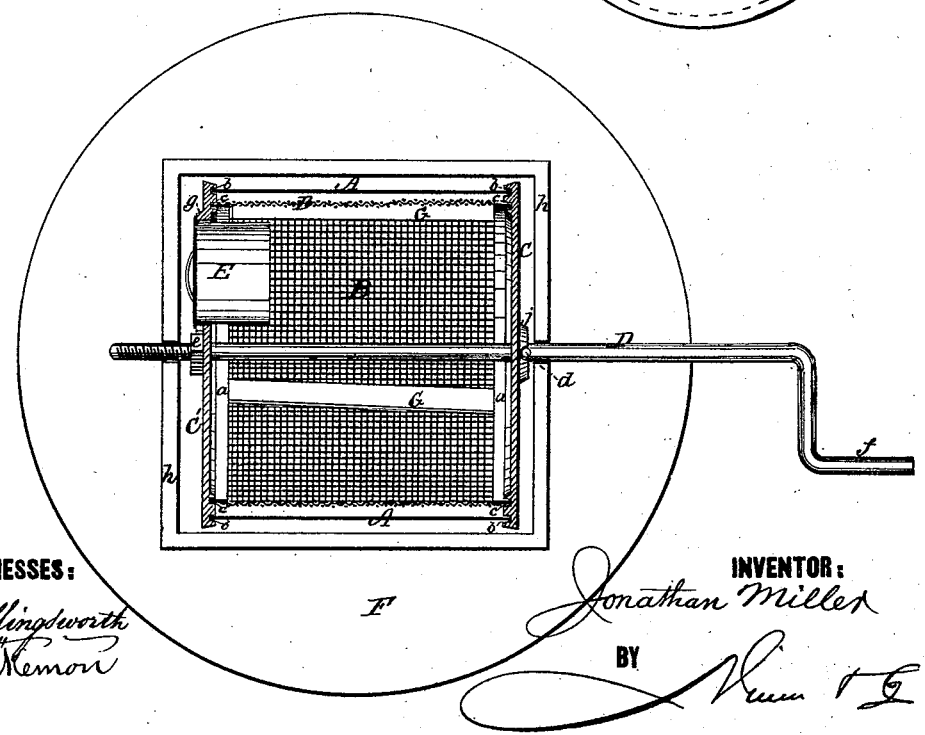
WITNESSES:
W. W. Hollingsworth
INVENTOR:
Jonathan Miller
BY
ATTORNEYS.

UNITED STATES PATENT OFFICE.

JONATHAN MILLER, OF TRENTON, NEW JERSEY, ASSIGNOR TO PRESSURE EXTRACT COMPANY, OF SAME PLACE.

IMPROVEMENT IN COFFEE-ROASTERS.

Specification forming part of Letters Patent No. 204,067, dated May 21, 1878; application filed September 13, 1877.

*To all whom it may concern:*

Be it known that I, JONATHAN MILLER, of Trenton, in the county of Mercer and State of New Jersey, have invented a new and Improved Coffee-Roaster; and I do hereby declare that the following is a full, clear, and exact description of the same, reference being had to the accompanying drawing, forming part of this specification, in which—

Figure 1 is a side view; Fig. 2, an end view of the cylinder, with a part in section; Fig. 3, a plan view, with the cylinder in horizontal section.

My invention relates to a novel construction of coffee-roaster; and it consists in a rotating cylinder having an inner lining of woven wire, in which a sheet-metal body of the cylinder and the inner woven-wire lining are held between two cast-iron heads grooved concentrically to receive the same, the heads being clamped together by a nut upon a central axis, which latter is extended and bent to form the crank.

The invention also consists in the means for rigidly connecting the cylinder with its axis, and in the casting of a flange about an eccentric opening in the cylinder-head, through which the coffee is introduced, which flange serves to hold a cup-shaped cover for said hole stiffly in its place.

In the drawing, A represents the body of the cylinder, made of sheet metal for lightness, durability, and quick heating, and B the inner lining or cylinder of woven wire, which keeps the coffee-beans from direct contact with the fire-heated surface and prevents them from burning. This inner cylinder of woven wire is provided with a set of wings, blades, or stirrers, G, which, as the cylinder revolves, continually stir the coffee-beans. These wings consist each of a strip of sheet metal, a portion of which is bent at right angles to occupy a radial position in the cylinder, and the other portion flat with the woven-wire cylinder, and extended beneath a marginal rim, *a*, which latter serves not only to hold the stirrer-blades, but also gives a clean and smooth edge for the inner cylinder, to cause it the better to fit the grooves in the cylinder-heads. C C' are said heads, which are made of cast-iron, with concentric grooves *b* and *c* near their peripheries, which respectively receive the two cylinders, the grooves *b* receiving the outer sheet-metal cylinder and the grooves *c* the inner cylinder of woven wire. These two cylinder-heads are arranged upon a central axial rod, D, and are clamped upon the same to hold the cylinders in place by a pin, *d*, and a screw-nut, *e*, arranged upon said axial rod. This rod is extended and bent to form a crank, *f*, and for turning the cylinder thereby the head C is formed with a channeled boss, *j*, in which channel the pin *d* is arranged to compel the axis and cylinder to turn rigidly together.

The cylinder-head C' is cast with a circular opening, through which the coffee is introduced and removed, and this opening is closed by a cup, E, which also serves to catch a portion of the coffee and permit the same to be withdrawn for inspection to determine the progress of the roasting. To hold the cup securely and stiffly in the opening, so that it may not accidentally drop out, the edges of the opening are flanged at *g*, so as to give a longer and stiffer bearing for said cup.

The cylinder, as thus described, may be built of any size and arranged upon bearings in any suitable connection. For ordinary household purposes, however, I have arranged it upon a circular cast-iron plate, F, which is constructed to fit upon any ordinary stove-hole. This plate is provided with a rectangular opening for the exposure of the cylinder to the fire, and from the edges of this opening rises a flange or wall, *h*, which is notched to form bearings for the shaft of the cylinder. From the bottom portion of this plate F also depend lugs *i*, which, when the plate is upon the stove-hole, project through the same to hold the plate in place, and which, when the plate is removed from the stove-hole and resting upon the top of the stove or upon the ground, operate as legs to support the device and allow the cylinder to be still freely revolved.

In relation to the construction of the roaster a distinctive feature is that the ends of the two cylinders are held firmly in the grooves in the heads, thereby keeping the annular space between them always the same, and compelling the steam or vapor to pass through the coffee or other material before it can escape.

By this arrangement the whole flavor and aroma are retained, and if the roaster be removed from the fire before the roasting is completed, it will be deposited upon the material again, giving it an oily appearance and fine flavor, the heat remaining in the coffee being sufficient to complete the roasting.

Having thus described my invention, what I claim as new is—

1. The woven-wire cylinder B, provided with stirrers G, composed of angular strips of sheet metal having their ends extended beneath and secured by a marginal rim, substantially as described.

2. The cylinder-heads C C', cast with concentric grooves $b$ $c$, and combined with the sheet-metal cylinder A, the woven-wire cylinder B, and the central shaft, and adapted to be clamped together, substantially as described.

3. The cylinder-head C, cast with a channeled boss, $j$, and combined with the central shaft having pin $d$, the intermediate shell, the opposite cylinder-head, and a clamping-nut arranged upon said central shaft, substantially as and for the purpose described.

4. The cylinder C', cast with an eccentric opening having flanged edges $g$, in combination with the cup E, substantially as shown and described.

The above specification of my invention signed by me this 7th day of September, 1877.

JONATHAN MILLER.

Witnesses:
EDWD. W. BYRN,
CHAS. A. PETTIT.